(12) United States Patent
Schmierer et al.

(10) Patent No.: US 11,537,358 B1
(45) Date of Patent: Dec. 27, 2022

(54) SOUND EXPERIENCE GENERATOR

(71) Applicant: Bayerische Motoren Werke Aktiengesellschaft, Munich (DE)

(72) Inventors: Gernot Schmierer, Munich (DE); Hans Florian Zimmer, Santa Monica, CA (US); Werner Haumayr, Neuried (DE); Young-Jae Cho, Kirchheim b. Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/452,870

(22) Filed: Oct. 29, 2021

Related U.S. Application Data

(60) Provisional application No. 63/229,859, filed on Aug. 5, 2021.

(51) Int. Cl.
| | |
|---|---|
| *G06F 3/16* | (2006.01) |
| *H04R 3/12* | (2006.01) |
| *H04R 5/04* | (2006.01) |
| *H04W 4/48* | (2018.01) |
| *H04W 4/80* | (2018.01) |
| *H04W 4/02* | (2018.01) |

(52) U.S. Cl.
CPC .............. *G06F 3/165* (2013.01); *H04R 3/12* (2013.01); *H04R 5/04* (2013.01); *H04W 4/48* (2018.02); *H04R 2430/01* (2013.01); *H04R 2499/13* (2013.01); *H04W 4/025* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 10,993,028 | B2* | 4/2021 | Konno | H04R 3/12 |
| 11,049,488 | B2* | 6/2021 | Jung | A63G 31/16 |
| 11,275,550 | B2* | 3/2022 | Bethurum | H04R 1/22 |
| 11,302,299 | B2* | 4/2022 | Loh | H04R 3/00 |
| 2021/0094469 | A1* | 4/2021 | Akahori | G06F 3/165 |
| 2021/0201885 | A1* | 7/2021 | Bastyr | H04R 1/025 |
| 2021/0225356 | A1* | 7/2021 | Miura | H03G 3/301 |
| 2021/0407492 | A1* | 12/2021 | Chang | G10L 25/18 |
| 2022/0185179 | A1* | 6/2022 | Kim | B60Q 5/008 |

* cited by examiner

*Primary Examiner* — Paul W Huber
(74) *Attorney, Agent, or Firm* — Crowell & Moring LLP

(57) ABSTRACT

Audio data is generated for a vehicle audio system using a portable computing device. Vehicle parameter data is received at the portable computing device from a vehicle. Sound parameter data is generated from the vehicle parameter data. Audio data is generated using a synthesizer based on the sound parameter data. The generated audio data is transmitted to the vehicle audio system from the portable computing device.

24 Claims, 4 Drawing Sheets

SOUND EXPERIENCE GENERATOR

CROSS REFERENCE TO RELATED APPLICATION

This application claims priority under 35 U.S.C. § 119 from U.S. Provisional Application No. 63/229,859, filed Aug. 5, 2021, the entire disclosure of which are herein expressly incorporated by reference.

BACKGROUND AND SUMMARY OF THE INVENTION

Battery-powered electric vehicles (BEVs), as well as hybrid electric vehicles (HEVs), may rely in large part on electric motors for propulsion. Electric motors may operate substantially more efficiently than internal combustion engines; delivering power smoothly to the wheels with less heat, vibration, and noise. On the other hand, internal combustion engine (ICE)-based vehicles, particularly high-performance internal combustion engine (ICE)-based vehicles, may produce resonant sounds designed to induce the thrill and excitement of driving. While modern BEVs and HEVs may provide performance comparable to their ICE-based counterparts, some may find the driving experience bland and unengaging.

The sound of a vehicle may be distinctive, conveying the brand identity in the same way as styling or a logo. The characteristic sound produced by a vehicle may be considered part of its personality, communicating the operating conditions to its passengers while alerting others of its presence.

The sound produced by ICE-based vehicles may be present both inside and outside of the vehicle. At low speeds, the external sound of an ICE-based vehicle may communicate its presence; e.g., pedestrians may hear the vehicle before they see it. The ability of pedestrians and cyclists to avoid injury caused by collisions with vehicles may weigh largely on whether the vehicles can be easily detected and recognized. For this reason, both the European Union and the National Highway Traffic Safety Administration (NHTSA) have established regulations requiring hybrid and electric vehicles to emit a minimum level of "motor vehicle" sound while traveling. At higher speeds, the noise generated by moving air may dominate the interior sound. BEVs may possess an advantage over ICE-based vehicles in that the sound generated inside the vehicle may not necessarily be relevant to sound that is artificially generated outside of the vehicle to fulfill safety requirements, for example.

Accordingly, the sound produced by a vehicle may be useful to enhance the driving experience, strengthen brand identity, and increase the safety of others who share the roads.

According to an embodiment of the present subject matter, a method of generating audio data using a portable computing device may include the steps of: receiving, at the portable computing device, vehicle parameter data from a vehicle; generating, using the portable computing device, sound parameter data from the vehicle parameter data; generating, using the portable computing device, the audio data based on the sound parameter data; and transmitting the audio data from the portable computing device to the vehicle. The sound parameter data may conform to a MIDI protocol and/or Open Sound Control protocol. The vehicle parameter data may include vehicle sensor data including one or more of: accelerator pedal angle, vehicle velocity, current road load, engine or motor speed, steering angle, global positioning system (GPS) coordinates, microphone data, or any fieldbus data such as Controller Area Network (CAN) bus data. The sound parameter data from which the vehicle parameter data is translated may include one or more of: pitch, volume, channel, instrument, effect, sound position, note on, note off, sample, or loop.

In a development, the method may further include combining the vehicle parameter data with one or more of GPS coordinate data, map data, season, time, date, or ambient brightness data.

In a further development, the method may include selecting one or more orchestrated sound scenes and/or tracks based on the vehicle parameter data. The method may further include combining a plurality of selected orchestrated sound scenes and/or tracks to generate an orchestrated audio sound.

In another development, the method may include determining, based on the vehicle parameter data, that a vehicle passenger is speaking, the vehicle is operating in an autonomous mode, and/or the vehicle is utilizing cruise control, and in response, disabling the generation and/or transmission of the audio data.

In a development, the method may further include determining, based on a plurality of vehicle parameter data, a derivative of a first vehicle sensor value, and predicting a future second vehicle sensor value based on the determined derivative of the first vehicle sensor value. The vehicle parameter data may indicate a change in a vehicle engine or motor speed, and in response, the generated sound parameter data may include a corresponding change in pitch.

According to an embodiment of the present subject matter, a method of outputting audio within a vehicle using a portable computing device may include the steps of: aggregating vehicle-specific parameter data from one or more vehicle sensors of the vehicle; pre-processing the vehicle-specific parameter data to generate generic vehicle parameter data; transmitting the generic vehicle parameter data to the portable computing device; receiving audio data from the portable computing device based on the generic vehicle parameter data; and outputting the received audio data using an audio playback device disposed within the vehicle. The vehicle-specific parameter data may include vehicle sensor data including one or more of: accelerator pedal angle, vehicle velocity, current road load, engine or motor speed, steering angle, GPS coordinates, microphone data, or fieldbus data such as Controller Area Network (CAN) bus data.

In a development, the method may further include combining the vehicle parameter data with one or more of GPS coordinate data, map data, season, time, date, or ambient brightness data.

In a further development, the received audio data may include a plurality of audio streams, and each audio stream of the plurality of audio streams may be personalized to a passenger of the vehicle based on a selection provided via the portable computing device.

According to an embodiment of the present subject matter, a non-transitory computer-readable medium may include instructions operable, when executed by a computing device, to carry out any of the methods described above.

Other objects, advantages and novel features of the present invention will become apparent from the following detailed description of one or more preferred embodiments when considered in conjunction with the accompanying drawings.

DETAILED DESCRIPTION OF THE DRAWINGS

The present subject matter may leverage vehicle operating data, event data, and/or driver inputs to generate a corresponding sound or sounds in response. The generated sounds may vary widely in type and format, such as reproduced automobile engine sounds, fictional vehicle sounds, short duration event-based sounds and jingles, or even a continuous musical soundtrack. The generated sounds may reflect the performance of the vehicle in a driving situation, such as acceleration, deceleration, braking, turning, idling, shifting gears, cruising, and the like, and/or correspond to specific events, such as raising or lowering a window. The generated sounds may vary with the selection of a vehicle driving mode, such as sport, eco, comfort, autonomous, semi-autonomous, and the like. Alternatively, or in addition, the sounds may be generated by an external, portable computing device of a user in response to the driver's inputs and vehicle operating conditions. The sounds may be output via the vehicle's existing audio system components, headphones, or other external speakers connected to the user's mobile device to deliver an emotionally-rich driving experience.

Generating the sounds using the user's external device may provide a variety of advantages. For instance, some vehicles may possess little or no capability to generate the array of sounds as described herein. Using the external device may allow the user to perpetually and flexibly upgrade the sound-processing hardware and software, storage memory capacity, and/or the sound libraries, sound scenes, and datasets without being constrained to the fixed sound processing hardware, if any, of the vehicle. Additionally, performing the sound generation in the external device of the user may offload the sound generation and associated processing from the vehicle hardware infrastructure and allow the user to enjoy the provided sounds as he or she moves to using other vehicles. In this way, the sound-generating capability "travels" with the user. The vehicles used with the present subject matter may be ICE-based, electric, hybrid, or the like. In some embodiments, the vehicle may be designed for a single user and/or human-powered, such as a wheelchair, motorcycle, bicycle, scooter, skateboard, and the like. Where the subject vehicle lacks its own audio system, the user's portable computing device may also perform the function of outputting the sound through another connected audio reproduction device, such as an internal speaker, headphones, earpieces, and/or the like.

Figure 1:
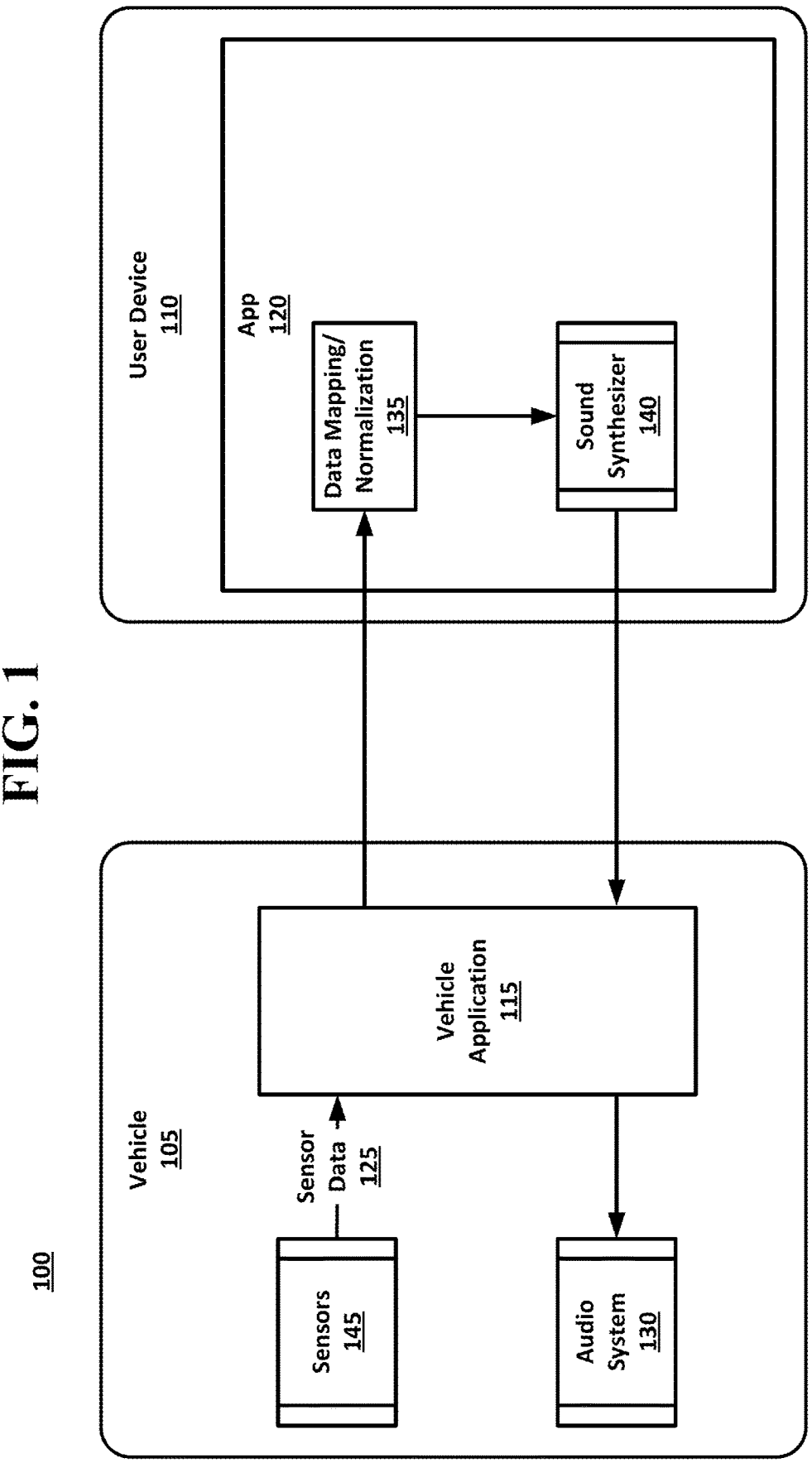
FIG. 1 is a block diagram overview of the sound system in accordance with an embodiment of the present subject matter.

FIG. 1 illustrates a block diagram overview of a sound system 100 according to an embodiment of the present subject matter. A vehicle 105 may include a variety of hardware and software components to communicate with a user device 110. The vehicle 105 may include numerous vehicle sensors 145 that provide data in the form of signals to a microprocessor of the vehicle 105. The vehicle sensors 145 may be communicatively coupled to measure vehicle, passenger, and location parameters. In an embodiment, vehicle sensor data 125 may include vehicle data including the vehicle accelerator pedal angle, velocity, the current road load (the instantaneous torque requirements to maintain a given velocity), engine or motor speed, steering angle, GPS location, GPS time/date, additional passengers and any other parameter available, such as those vehicle parameters transmitted on a field bus (e.g., Controller Area Network (CAN bus)). The vehicle sensor data 125 may also include data obtained from internal and external cameras or other sensors, including facial recognition data, and/or sensed gestures. A microphone may also provide vehicle sensor data 125 that may be used to determine whether a passenger is speaking, to infer a passenger's mood, and/or to determine whether a passenger is providing a verbal command.

The vehicle application 115 may collect and transmit the vehicle sensor data 125 to the user device 110 without processing, or at least without substantially processing the vehicle sensor data 125 other than to merely format the data, for example, as will be subsequently described. In this way, the vehicle sensor data 125 may be understood to be provided in a relatively "raw" format, which may depend on the specific characteristics of each vehicle, the number of passengers, and the driver's behaviors. The substantive processing of the vehicle sensor data 125 may instead be largely performed by a processor of the user device 110.

In an embodiment, the vehicle application 115 may perform pre-processing of the vehicle sensor data 125, for example, to limit the range of the sensor values, normalize the vehicle sensor data, exclude irrelevant vehicle sensor data, combine vehicle sensor data, extrapolate additional vehicle sensor data, generalize the vehicle sensor data, discretize the vehicle sensor data, and/or convert the vehicle sensor data 125 into an alternate format. In an example, a vehicle 105 may be a BEV having multiple electric motors and multiple tachometer sensors coupled to provide multiple tachometer sensor signals from each. The vehicle application 115 may combine the multiple tachometer sensor signals into a single tachometer sensor signal during the pre-processing, which may then be considered generic and/or non-specific to the BEV. The pre-processing may be used to produce uniform input data regardless of specific vehicle sensor data ranges, i.e. motor power, vehicle weight, additional nomadic weight, assistant systems which may alter the proportionality between steering wheel angle and real angle on the front and rear wheels, and the like. Pre-processing the vehicle sensor data 125 in this way may reduce the algorithmic complexity of the subsequent modules in the data path, including the app 120, data mapping/normalization module 135, and sound synthesizer 140. For example, if the speed of one vehicle can range between 0 and 160 miles per hour (MPH) and the speed of another (less capable) vehicle ranges between 0 and 130 MPH, the pre-processing may normalize both ranges to 0.0-1.0, where "1.0" corresponds to 160 MPH for one vehicle and 130 MPH for the other. In this way, the pre-processing performed by the vehicle application 115 may standardize or genericize the vehicle sensor data 125 in that it may pre-process a wide array of disparate, vehicle-specific sensor data 125 into input vehicle sensor data having a uniform, limited, unspecific, and/or simpler format for the app 120. The pre-processing performed by the vehicle application 115 may remove or modify GPS coordinates, location-specific data, passenger profile data, historical driving data, and user data that could foreseeably be used to specifically identify the vehicle passengers, the vehicle 105, and/or the vehicle location. The pre-processed input data may be subsequently operated on by each of the app 120, data mapping/normalization module 135, and sound synthesizer 140 without regard to vehicle-specific sensor characteristics.

Additional filtering may be incorporated to increase the signal-to-noise ratio to extract additional information from the vehicle sensor data 125 based on the location within the vehicle 105 and how the sensor is attached to the vehicle system; i.e., structure-born noise. As different vehicle sensors 145 in vehicles may have different sample rates, the vehicle sensor data 125 sampling rates may be resampled to a sampling rate that is anticipated by the receiving modules; i.e., app 120, data mapping/normalization module 135, and sound synthesizer 140. In an example, the vehicle sensor data 125 may include a vehicle location that may be synthesized to higher-grade data by combining the GPS coordinates and/or other map data. The GPS coordinates and/or map data may be utilized to generate broad geographical classifications, such as seaside, urban, rural, or mountainous, which may be used to affect the selection of orchestrated sound "scenes" and tracks, which will be subsequently described. The higher-grade data may also be further refined by synthesizing the data with the current season, time of day, and ambient brightness, which may also be used to affect the selection of orchestrated sound scenes and tracks.

The user device 110 may be, for example, a mobile computing device such as a smart phone, tablet, personal digital assistant (PDA), or the like. The user device 110 may include a processor and memory containing instructions that, when executed, implement the app 120. The app 120 may perform a data mapping/normalization 135 routine that maps and/or normalizes the received processed vehicle sensor data from the vehicle 105. The data mapping/normalization module 135 may include routines that prepare and route the data received from the vehicle 105 and/or the higher-grade data to the input of the sound synthesizer 140. The routines of the data mapping/normalization module 135 may also normalize the specific vehicle data and/or the higher-grade data to a plurality of sound parameter data, including predetermined frequency (pitch), volume (velocity), channel (track), instrument, effect, position (center, left, right, front, rear), note on (e.g., begin B-flat), note off (e.g., end B-flat), sample, loop, and the like, of one or more selected tracks of the sound synthesizer 140.

In an example, the vehicle motor speed as determined by a tachometer sensor of the vehicle 105 may be translated to or used to generate sound parameter data that correspondingly adjusts the pitch and volume of a musical arrangement relative to the vehicle motor speed, where a higher motor speed may correspond to a higher pitch and higher volume than a lower motor speed. In another example, GPS coordinate data may indicate that the vehicle is traveling on a highway adjacent to the ocean on the driver's left. The GPS coordinate data may be translated to sound parameter data that includes specifying an "ocean waves" sound effect loop to be played back through a left-side sound position (e.g., front left vehicle speaker).

The sound parameter data and associated tracks translated from the vehicle data may be subsequently input to the sound synthesizer 140. The tracks may be controlled directly by the specific vehicle data or higher-grade data, and the sum of all those controlled tracks may be utilized by the sound synthesizer 140 to generate the orchestrated audio sound. The orchestrated sound may be subsequently provided to the audio system 130. In an embodiment, the data mapping/normalization module 135 may map the data received from vehicle 105 to MIDI and/or Open Sound Control protocol messages. It should be appreciated that sound parameter data produced by the data mapping/normalization module 135 may not be an audio signal, but rather data that specifies parameters that sound synthesizer 140 can use to generate audio data that can be reproduced using conventional audio equipment; e.g., loudspeakers, headphones, and the like.

The sound synthesizer 140 may be a software and/or hardware-based synthesizer capable of interpreting MIDI and/or Open Sound Control protocol messages to generate audio data in response, which may be reproduced using the audio system 130 or other passenger audio playback devices. Sound synthesizer 140 may include an orchestration module, which may include a plugin-type system where different orchestrated sound scenes may be loaded, unloaded, and may be updated remotely via an app update or cloud-based API. Orchestrated scenes may comprise a set of instruments, sounds, effects, and loops. For example, an orchestrated scene may be a composition of instruments/sounds regarding their location in an acoustic room and their behavior on defined stimuli (such as the vehicle data). These orchestrated scenes may be composed "by hand" by an artist, programmer, sound designer, composer, etc., but may also incorporate machine-learning. For example, a feedback loop with the vehicle sensor data 125 may be used to infer a preference match between a user and a selected orchestrated scene to further improve the user experience. This can also be used for federated machine learning in combination with cloud-based APIs. The mapped and normalized data may be input to sound synthesizer 140. Based on the mapped and normalized data, the sound synthesizer 140 may generate audio data using a digital sound module, for instance. The generated audio data may be subsequently transmitted to the vehicle 105 using a transmission component of the user device 110. The transmission component may be, where user device 110 is a smartphone, for example, an antenna and RF transceiver. The vehicle application 115 may, upon receipt of the audio data, pass the audio data to the audio system 130 to playback via one or more speakers of the vehicle 105 or other passenger audio playback devices.

In an embodiment, the vehicle 105 may accommodate multiple passengers, and each passenger of vehicle 105 may provide his or her own localized audio system via headphones, localized speakers, the speakers of a mobile computing device, smartphone, and the like. As used herein, localized audio should be understood to mean that the passenger hears an audio stream that is personalized to a passenger and is emitted in a manner such that it is heard at least with greater volume and clarity than localized audio that may be provided to other passengers. Each passenger of vehicle 105 having a localized audio system may select an audio preference or theme using his or her personal user device 110. Preferably, when a passenger is the recipient of his/her own localized audio, he/she will not hear localized audio streams provided to other passengers at all, and vice versa. Alternatively, or in addition, the vehicle may be configured to provide localized audio to one or more passengers via speakers in the headrests and sensors to detect occupancy, for example. The sound could be deployed depending on individual passenger preferences; e.g., if the driver wants to experience a "Sport Mode" engine sound, another passenger could still simultaneously experience a "Quiet Mode" engine sound, or a completely different sound altogether, such as a symphonic overture.

Figure 2:
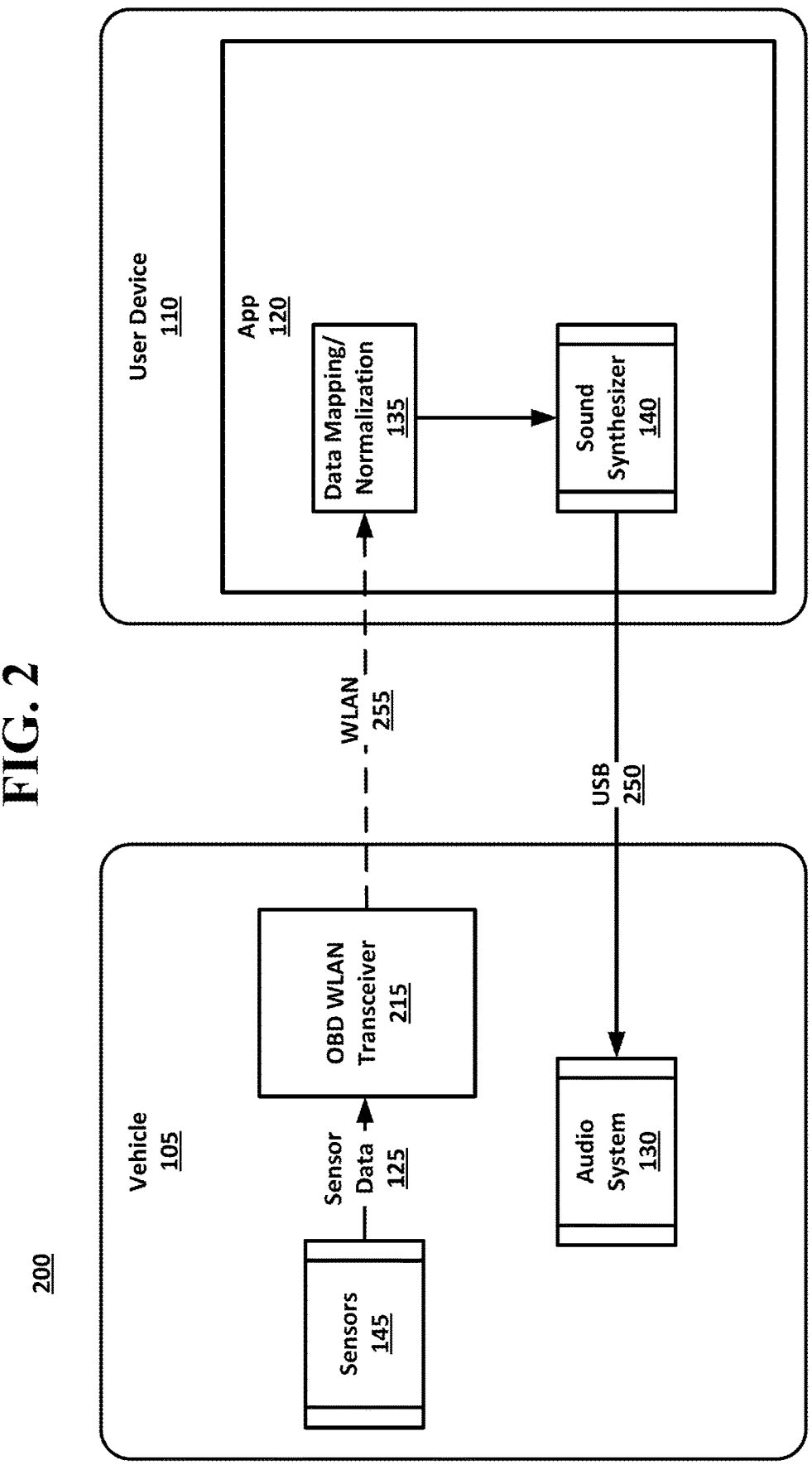
FIG. 2 is a block diagram overview of the sound system when used with a vehicle having an internal combustion engine in accordance with an embodiment of the present subject matter.

FIG. 2 illustrates a block diagram overview of a sound system 200 according to an embodiment of the present subject matter. The sound system 200 of FIG. 2 may operate similarly to the sound system 100 with the following distinctions. In FIG. 2, the vehicle 105 may be a propelled by an internal combustion engine (ICE). Vehicle sensor data 125 of the vehicle 105 may be transmitted via an onboard data communication bus, such as a Controller Area Network (CAN) bus, to an on-board diagnostics (OBD) wireless local area network (WLAN) transceiver 215, which may utilize the WLAN data link 255 to transmit the vehicle sensor data 125 to the user device 110. As the sound system 200 may not include a vehicle application 115 as in the sound system 100 of FIG. 1, a similar form of pre-processing of the raw vehicle sensor data 125 may occur using the app 120 to similarly limit the range of the sensor values, normalize the data, exclude irrelevant data, generalize the data, discretize the data, and/or convert the data into an alternate format. The user device 110 may be connected via a universal serial bus (USB) link 250 (or similar link) to the audio system 130 of the vehicle 105 through which the audio data generated by the sound synthesizer 140 may be transmitted.

Figure 3:
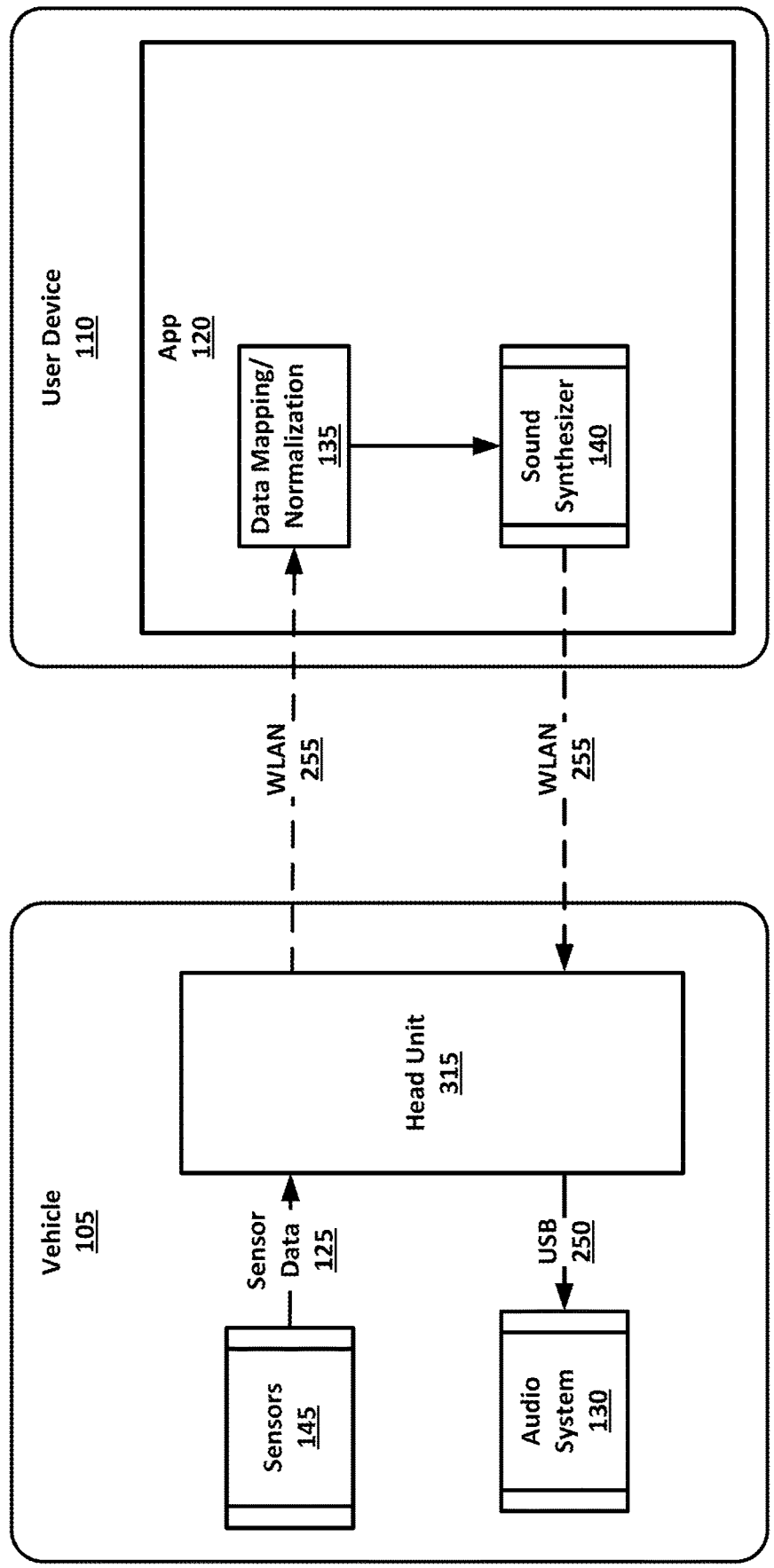
FIG. 3 is a block diagram overview of the sound system when used with an electric vehicle in accordance with an embodiment of the present subject matter.

FIG. 3 illustrates a block diagram overview of a sound system 300 according to an embodiment of the present subject matter. The sound system 300 of FIG. 3 may operate similarly to the sound system 100 with the following distinctions. In FIG. 3, the vehicle 105 may be a battery-powered electric vehicle (BEV) having direct access to a head unit 315. Head unit 315 may execute an onboard app (native head unit application) to retrieve and/or receive the vehicle sensor data 125. As in the sound system 100, the head unit 315 may perform pre-processing of the raw vehicle sensor data 125 to similarly limit the range of the sensor values, normalize the data, exclude irrelevant data, generalize the data, discretize the data, and/or convert the data into an alternate format. Once received, vehicle sensor data 125 may be transmitted wirelessly via the WLAN data link 255 to the user device 110. The user device 110 may process the vehicle sensor data 125 to generate the audio data, which may be similarly transmitted to the head unit 315 of the vehicle 105 using the WLAN data link 255. The head unit 315 may transmit the audio data generated by the sound synthesizer 140 of the user device 110 to the audio system 130 via a USB (or similar) link 250.

In any of sound systems 100/200/300, sounds may be generated by the sound synthesizer 140 to accompany or overlay a variety of vehicle-based events or situations. For instance, acceleration of the vehicle 105 may cause a corresponding sound be output by the audio system 130 based on audio data generated by the app 120. In another example, raising or lowering a window, locking a door, and/or adjusting a seat may cause a selected sound to be output. The ability of the app 120 to trigger the generation of a corresponding sound by sound synthesizer 140 may depend on whether the triggering condition can be obtained or predicted based on the available data from the vehicle, driver, and/or passengers. The app 120 may also inhibit sound generation as a result of detecting or predicting a triggering event. For instance, using an internal camera and/or microphone of vehicle 105, app 120 may detect that a vehicle passenger is speaking and cause generation of prospective sounds by sound synthesizer 140 to be temporarily disabled. Alternatively, or in addition, currently-playing sounds generated by the sound synthesizer 140 may be abruptly terminated based on detecting the same. Similarly, detecting the activation of a cruise control, autonomous, or semi-autonomous mode may cause generation of sound by sound synthesizer 140 to be suspended, since the user may not wish to be engaged in the driving experience during this time.

It may be desired to reduce the duration, or at least the apparent duration, of the data exchange between the vehicle 105 and user device 110. Outputting the generated sound via the audio system 130 with little or no perceived delay may convey the illusion that the vehicle 105 is generating the sound(s) as a result of its operation. To avoid "dead time" or perceived delay between the vehicle 105 operating conditions or events and the corresponding sound being output via the audio system 130, predictive algorithms may be utilized to compensate for the signal propagation time. The predictive algorithms may utilize derivatives of functions (e.g. accelerator pedal speed and acceleration instead of increments of the accelerator pedal angle, as detected by a corresponding accelerator pedal angle sensor) to estimate future states of the pedal, future motor/engine speeds, or future vehicle velocity. The predictive algorithms may be similarly applied to any of the vehicle sensors 145 or other sensed vehicle specific data. Using machine learning algorithms and other artificial intelligence techniques, it is possible to learn user behavior and to improve theses predictive algorithms over time. For instance, a feedback loop may be incorporated where a machine learning model is continually improved and retrained based on its generated predicted outputs. Using predictive algorithms, sound output via the audio system 130 may appear instantly responsive to the vehicle operating conditions, events, and/or driver inputs, which may create a more realistic impression of the sound being generated by the vehicle 105 rather than the user device 110.

In an embodiment, the user device 110 may be a portable computing device, such as a smart phone, personal digital assistant (PDA), notebook computer, laptop computer, tablet computer, handheld game console, or the like. Each of logic blocks 115, 120, 135, and/or 140 may be equivalently implemented using circuits, hardware, firmware, software containing instructions executable using a processor or processing device, and/or combinations of each to perform a function(s) or an action(s), and/or to cause a function or action from another logic, method, and/or system. Logic may include a software-controlled microprocessor, discrete logic (e.g., logic gates), analog circuits, digital circuits, a microcontroller, a programmed logic device (e.g., ASIC, FPGA), a memory device containing computer-executable instructions, and/or the like.

The vehicle 105 may be provided with computing capabilities, such as a microprocessor, which may be coupled to a memory containing instructions that, when executed by the microprocessor, implement the vehicle application 115. In an embodiment, the microprocessor may be included within an electronic control unit (ECU) or a plurality of electronic control units that may serve to control various vehicle systems and subsystems, as well as to aggregate the vehicle sensor data 125 obtained from vehicle sensors 145. In addition to the microprocessor and memory, the one or more ECUs may be implemented using one or more computing devices having an input/output (I/O) interface, a network interface, non-volatile storage, or the like, as further described with respect to FIG. 4.

Figure 4:
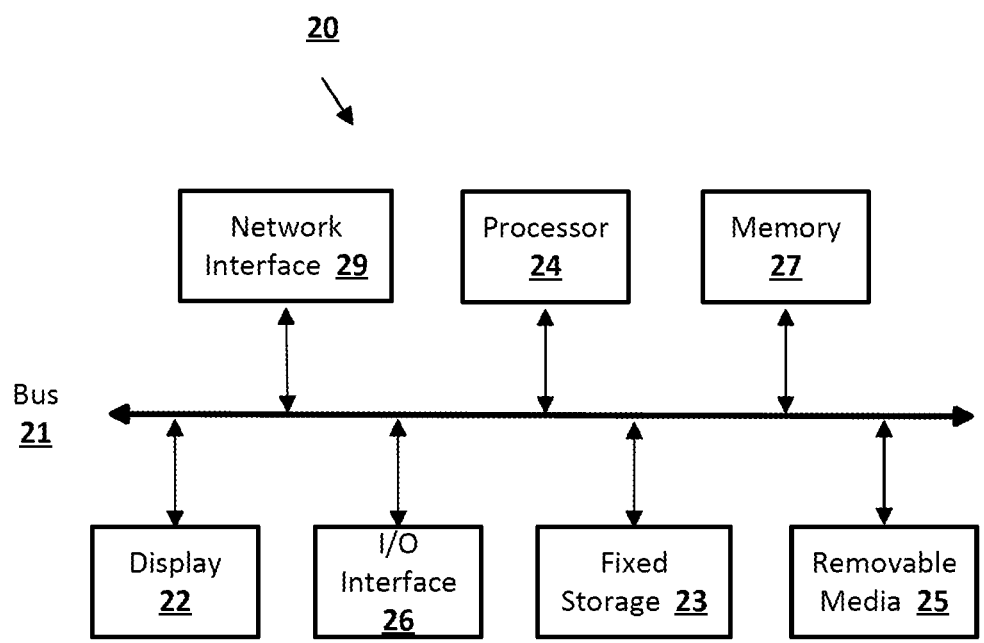
FIG. 4 is an exemplary user device according to an embodiment of the present subject matter.

Embodiments of the presently disclosed subject matter may be implemented in and used with a variety of component and network architectures. FIG. 4 is an example block diagram illustrating several components suitable for implementing the user device 110 and/or computer processing structures of the vehicle 105, which may enable the present subject matter. The computing device 20 may be, for example, an embedded system, an electronic control unit, a mobile computing device such as a smart phone, tablet, or the like. The computing device 20 may include a bus 21 which interconnects major components of the computing device 20, such as a central processing unit (CPU) 24, a memory 27 such as Random Access Memory (RAM), Read Only Memory (ROM), flash RAM, or the like, a user display 22, such as a display screen, an I/O interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash memory, and the like, and a network interface 29 operable to communicate with one or more remote devices via a suitable network connection.

In considering the processing capabilities of vehicle 105, the bus 21 may be a Controller Area Network (CAN bus) disposed within vehicle 105 and interconnect a plurality of electronic control units within a vehicle 105. Alternatively, or in addition, the bus 21 may be directly or indirectly connected to a vehicle bus, such as the CAN bus via an appropriate bus interface that translates the communication between the two as needed. The bus 21 may allow data communication between the CPU 24 and one or more memory components, which may include RAM, ROM, and other memory, as well as vehicle components including electronic control units, vehicle sensors 145, actuators, servos, and the like, as previously noted. The CPU 24 may be combined with additional components to form a microcontroller. Typically, RAM is the main memory into which an operating system and application programs are loaded. A ROM or flash memory component can contain, among other code, boot code, or the Basic Input-Output system (BIOS) which controls basic hardware operation such as the interaction with peripheral components. Applications resident with the computing device 20 are generally stored on and accessed via a non-transitory computer readable medium, such as a hard disk drive (e.g., fixed storage 23), an optical drive, flash drive or other floating-gate-type memory, floppy disk, or other storage medium.

The fixed storage 23 may be integral with the computing device 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computing device to communicate with other computers or vehicles via one or more local, wide-area, or other communication networks, as described in further detail below.

Many other devices or components (not shown) may be connected in a similar manner. Conversely, all the components shown in FIG. 4 need not be present to practice the present disclosure. The components can be interconnected in different ways from that shown. The operation of a computing device 20 such as that shown in FIG. 4 is readily known in the art and is not discussed in detail in this application. Code to implement the present disclosure can be stored in non-transitory computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, floating-gate semiconductor memory, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

Reference throughout this document to "one embodiment", "certain embodiments", "an embodiment" or similar term means that a feature, structure, or characteristic described in connection with the embodiment is included in at least one embodiment of the present subject matter. Thus, the appearances of such phrases or in various places throughout this specification are not necessarily all referring to the same embodiment. Furthermore, the features, structures, or characteristics from any number of the disclosed embodiments may be combined in any suitable manner without limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A method of generating audio data using a portable computing device, comprising:
   receiving, at the portable computing device, vehicle parameter data from a vehicle;
   generating, using the portable computing device, sound parameter data from the vehicle parameter data;
   generating, using the portable computing device, the audio data based on the sound parameter data; and
   transmitting the audio data from the portable computing device to the vehicle.

2. The method of claim 1, wherein
   the sound parameter data conforms to a MIDI protocol and/or Open Sound Control protocol.

3. The method of claim 1, wherein
   the vehicle parameter data comprises vehicle sensor data that comprises one or more of:
   accelerator pedal angle;
   vehicle velocity;
   current road load;
   engine or motor speed;
   steering angle;
   GPS coordinates;
   microphone data; or
   fieldbus data.

4. The method of claim 1, wherein
   the sound parameter data from which the vehicle parameter data is translated comprises one or more of:
   pitch;
   volume;
   channel;
   instrument;

effect;
sound position;
note on;
note off;
sample; or
loop.

5. The method of claim 1, further comprising:
combining the vehicle parameter data with one or more of GPS coordinate data, map data, season, time, date, or ambient brightness data.

6. The method of claim 1, further comprising:
selecting one or more orchestrated sound scenes and/or tracks based on the vehicle parameter data.

7. The method of claim 6, further comprising:
combining a plurality of selected orchestrated sound scenes and/or tracks to generate an orchestrated audio sound.

8. The method of claim 1, further comprising:
determining, based on the vehicle parameter data, that a vehicle passenger is speaking, the vehicle is operating in an autonomous mode, and/or the vehicle is utilizing cruise control; and
in response, disabling the generation and/or transmission of the audio data.

9. The method of claim 1, further comprising:
determining, based on a plurality of vehicle parameter data, a derivative of a first vehicle sensor value; and
predicting a future second vehicle sensor value based on the determined derivative of the first vehicle sensor value.

10. The method of claim 1, wherein
the vehicle parameter data indicates a change in a vehicle engine or motor speed; and
in response, the generated sound parameter data comprises a corresponding change in pitch.

11. A non-transitory computer-readable medium comprising instructions operable, when executed by a portable computing device, to:
receive, at the portable computing device, vehicle parameter data from a vehicle; generate, using the portable computing device, sound parameter data from the vehicle parameter data;
generate, using the portable computing device, audio data based on the sound parameter data; and
transmit the audio data from the portable computing device to the vehicle.

12. The medium of claim 11, wherein
the sound parameter data conforms to a MIDI protocol and/or Open Sound Control protocol.

13. The medium of claim 11, wherein
the vehicle parameter data comprises vehicle sensor data that comprises one or more of:
accelerator pedal angle;
vehicle velocity;
current road load;
engine or motor speed;
steering angle;
GPS coordinates;
microphone data; or
fieldbus data.

14. The medium of claim 11, wherein
the sound parameter data from which the vehicle parameter data is translated comprises one or more of:
pitch;
volume;
channel;
instrument;
effect;
sound position;
note on;
note off;
sample; or
loop.

15. The medium of claim 11, further comprising instructions operable, when executed by the portable computing device, to:
combine the vehicle parameter data with one or more of GPS coordinate data, map data, season, time, date, or ambient brightness data.

16. The medium of claim 11, further comprising instructions operable, when executed by the portable computing device, to:
select one or more orchestrated sound scenes and/or tracks based on the vehicle parameter data.

17. The medium of claim 16, further comprising instructions operable, when executed by the portable computing device, to:
combine a plurality of selected orchestrated sound scenes and/or tracks to generate an orchestrated audio sound.

18. The medium of claim 11, further comprising instructions operable, when executed by the portable computing device, to:
determine, based on the vehicle parameter data, that a vehicle passenger is speaking, the vehicle is operating in an autonomous mode, and/or the vehicle is utilizing cruise control; and
in response, disable the generation and/or transmission of the audio data.

19. The medium of claim 11, further comprising instructions operable, when executed by the portable computing device, to:
determine, based on a plurality of vehicle parameter data, a derivative of a first vehicle sensor value; and
predict a future second vehicle sensor value based on the determined derivative of the first vehicle sensor value.

20. The medium of claim 11, wherein
the vehicle parameter data indicates a change in a vehicle engine or motor speed; and
in response, the generated sound parameter data comprises a corresponding change in pitch.

21. A method of outputting audio within a vehicle using a portable computing device, comprising:
aggregating vehicle-specific parameter data from one or more vehicle sensors of the vehicle;
pre-processing the vehicle-specific parameter data to generate generic vehicle parameter data;
transmitting the generic vehicle parameter data to the portable computing device;
receiving audio data from the portable computing device based on the generic vehicle parameter data; and
outputting the received audio data using an audio playback device disposed within the vehicle.

22. The method of claim 21, wherein
the vehicle-specific parameter data comprises vehicle sensor data comprising one or more of:
accelerator pedal angle;
vehicle velocity;
current road load;
engine or motor speed;
steering angle;
GPS coordinates;
microphone data; or
fieldbus data.

23. The method of claim 21, further comprising:
combining the vehicle parameter data with one or more of GPS coordinate data, map data, season, time, date, or ambient brightness data.

24. The method of claim 21, wherein
the received audio data comprises a plurality of audio streams; and
each audio stream of the plurality of audio streams is personalized to a passenger of the vehicle based on a selection provided via the portable computing device.

* * * * *